(12) United States Patent
Jacobsen (10) Patent No.: US 8,042,630 B2
(45) Date of Patent: Oct. 25, 2011

(54) SERPENTINE ROBOTIC CRAWLER

(75) Inventor: Stephen C. Jacobsen, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/820,881

(22) Filed: Jun. 22, 2010

(65) Prior Publication Data
US 2010/0258365 A1  Oct. 14, 2010

Related U.S. Application Data (63) Continuation of application No. 11/985,323, filed on Nov. 13, 2007, now abandoned.

(60) Provisional application No. 60/858,917, filed on Nov. 13, 2006.

(51) Int. Cl.
*B62D 55/265* (2006.01)

(52) U.S. Cl. ....... 180/9.46; 180/9.44; 180/9.4; 180/901; 280/5.22

(58) Field of Classification Search ................. 180/9.46, 180/9.44, 9.4, 901; 280/5.22; 104/138.1, 104/138.2
See application file for complete search history.

(56) References Cited

U.S. PATENT DOCUMENTS

| | | | |
|---|---|---|---|
| 1,107,874 A | 8/1914 | Appleby | |
| 1,112,460 A | 10/1914 | Leavitt | |
| 1,515,756 A | 11/1924 | Roy | |
| 1,975,726 A | 10/1934 | Martinage | |
| 2,025,999 A | 12/1935 | Myers | |
| 2,082,920 A | 6/1937 | Aulmont | |
| 2,129,557 A | 9/1938 | Beach | |
| 2,311,475 A | 2/1943 | Schmeiser | |
| 2,312,072 A | 2/1943 | Broadwater | |
| 2,329,582 A | 9/1943 | Bishop | |
| 2,345,763 A | 4/1944 | Mayne | |
| 2,701,169 A | 2/1955 | Cannon | |
| 2,850,147 A | 9/1958 | Hill | |
| 2,933,143 A | 4/1960 | Robinson | |
| 2,967,737 A | 1/1961 | Moore | |
| 3,037,571 A | 6/1962 | Zelle | |
| 3,060,972 A | 10/1962 | Sheldon | |
| 3,166,138 A | 1/1965 | Dunn, Jr. | |
| 3,190,286 A | 6/1965 | Stokes | |
| 3,215,219 A * | 11/1965 | Forsyth et al. ............... | 180/14.3 |

(Continued)

FOREIGN PATENT DOCUMENTS
CA 2512299 9/2004

(Continued)

OTHER PUBLICATIONS

U.S. Appl. No. 12/171,144; filed Jul. 10, 2008; Stephen C. Jacobsen; office action mailed Jan. 13, 2011.

(Continued)

*Primary Examiner* — Anne Marie Boehler
*Assistant Examiner* — Michael Stabley
(74) *Attorney, Agent, or Firm* — Thorpe North & Western LLP (57) ABSTRACT

A serpentine robotic crawler capable of multiple movement moves is disclosed. The serpentine robotic crawler includes a plurality of frame units, coupled together by at least one actuated linkage. Each frame unit includes a continuous track, enabling forward movement of the serpentine robotic crawler. The at least one actuated linkage has at least 7 degrees of movement freedom, enabling the serpentine robotic crawler to adopt a variety of poses.

20 Claims, 9 Drawing Sheets

U.S. PATENT DOCUMENTS

| | | | |
|---|---|---|---|
| 3,223,462 A | 12/1965 | Dalrymple | |
| 3,266,059 A | 8/1966 | Stelle | |
| 3,284,964 A | 11/1966 | Saito | |
| 3,311,424 A | 3/1967 | Taylor | |
| 3,362,492 A | 1/1968 | Hansen | |
| 3,387,896 A | 6/1968 | Sobota | |
| 3,489,236 A | 1/1970 | Goodwin | |
| 3,497,083 A | 2/1970 | Anderson | |
| 3,565,198 A | 2/1971 | Ames | |
| 3,572,325 A | 3/1971 | Bazell | |
| 3,609,804 A | 10/1971 | Morrison | |
| 3,650,343 A * | 3/1972 | Helsell | 180/9.4 |
| 3,700,115 A | 10/1972 | Johnson | |
| 3,707,218 A | 12/1972 | Payne | |
| 3,712,481 A | 1/1973 | Harwood | |
| 3,715,146 A | 2/1973 | Robertson | |
| 3,757,635 A | 9/1973 | Hickerson | |
| 3,808,078 A | 4/1974 | Snellman | |
| 3,820,616 A | 6/1974 | Juergens | |
| 3,841,424 A | 10/1974 | Purcell | |
| 3,864,983 A | 2/1975 | Jacobsen | |
| 3,933,214 A | 1/1976 | Guibord | |
| 3,934,664 A | 1/1976 | Pohjola | |
| 3,974,907 A | 8/1976 | Shaw | |
| 4,051,914 A | 10/1977 | Pohjola | |
| 4,059,315 A | 11/1977 | Jolliffe | |
| 4,068,905 A | 1/1978 | Black | |
| 4,107,948 A | 8/1978 | Maolaug | |
| 4,109,971 A | 8/1978 | Black | |
| 4,132,279 A | 1/1979 | Van der Lende | |
| 4,218,101 A | 8/1980 | Thompson | |
| 4,260,053 A | 4/1981 | Onodera | |
| 4,332,317 A | 6/1982 | Bahre | |
| 4,332,424 A | 6/1982 | Thompson | |
| 4,339,031 A | 7/1982 | Densmore | |
| 4,393,728 A | 7/1983 | Larson | |
| 4,396,233 A | 8/1983 | Slaght | |
| 4,453,611 A | 6/1984 | Stacy, Jr. | |
| 4,483,407 A | 11/1984 | Iwamoto et al. | |
| 4,489,826 A | 12/1984 | Dubson | |
| 4,494,417 A | 1/1985 | Larson | |
| 4,551,061 A | 11/1985 | Olenick | |
| 4,589,460 A | 5/1986 | Albee | |
| 4,621,965 A | 11/1986 | Wilcock | |
| 4,636,137 A | 1/1987 | Lemelson | |
| 4,646,906 A | 3/1987 | Wilcox, Jr. | |
| 4,661,039 A | 4/1987 | Brenhold | |
| 4,700,693 A | 10/1987 | Lia | |
| 4,706,506 A | 11/1987 | Lestelle | |
| 4,712,969 A | 12/1987 | Kimura | |
| 4,714,125 A | 12/1987 | Stacy, Jr. | |
| 4,727,949 A | 3/1988 | Rea | |
| 4,736,826 A | 4/1988 | White et al. | |
| 4,752,105 A | 6/1988 | Barnard | |
| 4,756,662 A | 7/1988 | Tanie | |
| 4,765,795 A | 8/1988 | Rebman | |
| 4,784,042 A | 11/1988 | Paynter | |
| 4,796,607 A | 1/1989 | Allred, III | |
| 4,806,066 A | 2/1989 | Rhodes | |
| 4,815,319 A | 3/1989 | Clement | |
| 4,815,911 A | 3/1989 | Bengtsson | |
| 4,818,175 A | 4/1989 | Kimura | |
| 4,828,339 A | 5/1989 | Thomas | |
| 4,848,179 A | 7/1989 | Ubhayakar | |
| 4,862,808 A | 9/1989 | Hedgcoxe | |
| 4,878,451 A | 11/1989 | Siren | |
| 4,900,218 A | 2/1990 | Sutherland | |
| 4,909,341 A * | 3/1990 | Rippingale et al. | 180/9.1 |
| 4,924,153 A | 5/1990 | Toru et al. | |
| 4,932,491 A | 6/1990 | Collins, Jr. | |
| 4,932,831 A | 6/1990 | White et al. | |
| 4,936,639 A | 6/1990 | Pohjola | |
| 4,997,790 A | 3/1991 | Woo | |
| 5,018,591 A | 5/1991 | Price | |
| 5,021,798 A | 6/1991 | Ubhayakar | |
| 5,022,812 A | 6/1991 | Coughlan | |
| 5,046,914 A | 9/1991 | Holland et al. | |
| 5,080,000 A | 1/1992 | Bubic | |
| 5,130,631 A | 7/1992 | Gordon | |
| 5,142,932 A | 9/1992 | Moya | |
| 5,174,168 A | 12/1992 | Takagi | |
| 5,174,405 A | 12/1992 | Carra | |
| 5,186,526 A | 2/1993 | Pennington | |
| 5,199,771 A | 4/1993 | James | |
| 5,205,612 A * | 4/1993 | Sugden et al. | 299/10 |
| 5,214,858 A | 6/1993 | Pepper | |
| 5,219,264 A | 6/1993 | McClure et al. | |
| 5,252,870 A | 10/1993 | Jacobsen | |
| 5,297,443 A | 3/1994 | Wentz | |
| 5,317,952 A | 6/1994 | Immega | |
| 5,337,732 A | 8/1994 | Grundfest | |
| 5,350,033 A | 9/1994 | Kraft | |
| 5,354,124 A | 10/1994 | James | |
| 5,363,935 A * | 11/1994 | Schempf et al. | 180/9.1 |
| 5,386,741 A | 2/1995 | Rennex | |
| 5,413,454 A | 5/1995 | Movsesian | |
| 5,426,336 A | 6/1995 | Jacobsen | |
| 5,428,713 A | 6/1995 | Matsumaru | |
| 5,435,405 A * | 7/1995 | Schempf et al. | 180/9.1 |
| 5,440,916 A | 8/1995 | Stone et al. | |
| 5,443,354 A | 8/1995 | Stone et al. | |
| 5,451,135 A | 9/1995 | Schempf | |
| 5,465,525 A | 11/1995 | Mifune | |
| 5,466,056 A | 11/1995 | James | |
| 5,469,756 A | 11/1995 | Feiten | |
| 5,516,249 A | 5/1996 | Brimhall | |
| 5,551,545 A | 9/1996 | Gelfman | |
| 5,556,370 A | 9/1996 | Maynard | |
| 5,562,843 A | 10/1996 | Yasumoto | |
| 5,567,110 A | 10/1996 | Sutherland | |
| 5,570,992 A | 11/1996 | Lemelson | |
| 5,573,316 A | 11/1996 | Wankowski | |
| 5,588,688 A | 12/1996 | Jacobsen | |
| 5,672,044 A | 9/1997 | Lemelson | |
| 5,697,285 A | 12/1997 | Nappi | |
| 5,712,961 A | 1/1998 | Matsuo | |
| 5,749,828 A | 5/1998 | Solomon | |
| 5,770,913 A | 6/1998 | Mizzi | |
| 5,816,769 A | 10/1998 | bauer | |
| 5,821,666 A | 10/1998 | Matsumoto | |
| 5,842,381 A | 12/1998 | Feiten | |
| RE36,025 E | 1/1999 | Suzuki | |
| 5,878,783 A * | 3/1999 | Smart | 138/93 |
| 5,888,235 A | 3/1999 | Jacobsen | |
| 5,902,254 A | 5/1999 | Magram | |
| 5,906,591 A | 5/1999 | Dario | |
| 5,984,032 A | 11/1999 | Gremillion | |
| 5,996,346 A | 12/1999 | Maynard | |
| 6,016,385 A | 1/2000 | Yee | |
| 6,030,057 A | 2/2000 | Fikse | |
| 6,056,237 A | 5/2000 | Woodland | |
| 6,107,795 A * | 8/2000 | Smart | 324/220 |
| 6,109,705 A | 8/2000 | Courtemanche | |
| 6,113,343 A | 9/2000 | Goldenberg et al. | |
| 6,132,133 A | 10/2000 | Muro et al. | |
| 6,138,604 A | 10/2000 | Anderson | |
| 6,162,171 A | 12/2000 | Ng | |
| 6,186,604 B1 | 2/2001 | Fikse | |
| 6,203,126 B1 | 3/2001 | Harguth | |
| 6,260,501 B1 | 7/2001 | Agnew | |
| 6,263,989 B1 | 7/2001 | Won | |
| 6,264,293 B1 | 7/2001 | Musselman | |
| 6,264,294 B1 | 7/2001 | Musselman et al. | |
| 6,281,489 B1 | 8/2001 | Tubel et al. | |
| 7,843,431 B2 | 11/2001 | Robbins et al. | |
| 6,325,749 B1 | 12/2001 | Inokuchi et al. | |
| 6,333,631 B1 | 12/2001 | Das et al. | |
| 6,339,993 B1 | 1/2002 | Comello | |
| 6,380,889 B1 | 4/2002 | Herrmann et al. | |
| 6,394,204 B1 | 5/2002 | Haringer | |
| 6,405,798 B1 | 6/2002 | Barrett et al. | |
| 6,408,224 B1 | 6/2002 | Okamoto | |
| 6,411,055 B1 | 6/2002 | Fujita | |
| 6,422,509 B1 | 7/2002 | Yim | |
| 6,430,475 B2 | 8/2002 | Okamoto | |
| 6,431,296 B1 | 8/2002 | Won | |
| 6,446,718 B1 | 9/2002 | Barrett et al. | |

| | | | | | | |
|---|---|---|---|---|---|---|
| 6,450,104 B1 * | 9/2002 | Grant et al. ............... 104/138.2 | 2005/0235899 A1 | 10/2005 | Yamamoto | |
| 6,484,083 B1 | 11/2002 | Hayward | 2005/0288819 A1 | 12/2005 | de Guzman | |
| 6,488,306 B1 | 12/2002 | Shirey et al. | 2006/0000137 A1 | 1/2006 | Valdivia y Alvarado | |
| 6,505,896 B1 | 1/2003 | Boivin | 2006/0005733 A1 | 1/2006 | Rastegar et al. | |
| 6,512,345 B2 | 1/2003 | Borenstein | 2006/0010702 A1 | 1/2006 | Roth | |
| 6,523,629 B1 * | 2/2003 | Buttz et al. .................... 180/167 | 2006/0070775 A1 | 4/2006 | Anhalt | |
| 6,529,806 B1 | 3/2003 | Licht | 2006/0156851 A1 | 7/2006 | Jacobsen | |
| 6,540,310 B1 | 4/2003 | Cartwright | 2006/0225928 A1 | 10/2006 | Nelson | |
| 6,557,954 B1 | 5/2003 | Hattori | 2006/0229773 A1 | 10/2006 | Peretz | |
| 6,563,084 B1 | 5/2003 | Bandy | 2007/0029117 A1 | 2/2007 | Goldenberg et al. | |
| 6,574,958 B1 | 6/2003 | MacGregor | 2007/0156286 A1 | 7/2007 | Yamauchi | |
| 6,576,406 B1 | 6/2003 | Jacobsen et al. | 2007/0193790 A1 | 8/2007 | Goldenberg et al. | |
| 6,595,812 B1 | 7/2003 | Haney | 2007/0260378 A1 | 11/2007 | Clodfelter | |
| 6,610,007 B2 | 8/2003 | Tartaglia et al. | 2008/0115687 A1 | 5/2008 | Gal et al. | |
| 6,619,146 B2 | 9/2003 | Kerrebrock | 2008/0136254 A1 | 6/2008 | Jacobsen | |
| 6,651,804 B2 | 11/2003 | Thomas | 2008/0164079 A1 | 7/2008 | Jacobsen | |
| 6,652,164 B2 | 11/2003 | Stiepel et al. | 2008/0167752 A1 | 7/2008 | Jacobsen | |
| 6,668,951 B2 | 12/2003 | Won | 2008/0168070 A1 | 7/2008 | Naphade | |
| 6,708,068 B1 | 3/2004 | Sakaue | 2008/0215185 A1 | 9/2008 | Jacobsen | |
| 6,715,575 B2 | 4/2004 | Karpik | 2008/0217993 A1 | 9/2008 | Jacobsen | |
| 6,772,673 B2 | 8/2004 | Seto | 2008/0272647 A9 | 11/2008 | Hirose et al. | |
| 6,773,327 B1 | 8/2004 | Felice | 2008/0281231 A1 | 11/2008 | Jacobsen et al. | |
| 6,774,597 B1 * | 8/2004 | Borenstein ............... 318/568.12 | 2008/0281468 A1 | 11/2008 | Jacobsen et al. | |
| 6,799,815 B2 | 10/2004 | Krishnan | 2008/0284244 A1 | 11/2008 | Hirose et al. | |
| 6,820,653 B1 * | 11/2004 | Schempf et al. ............... 138/98 | 2009/0025988 A1 | 1/2009 | Jacobsen et al. | |
| 6,831,436 B2 | 12/2004 | Gonzalez | 2009/0030562 A1 | 1/2009 | Jacobsen et al. | |
| 6,835,173 B2 | 12/2004 | Couvillon, Jr. | 2009/0035097 A1 | 2/2009 | Loane | |
| 6,837,318 B1 | 1/2005 | Craig | 2009/0171151 A1 | 7/2009 | Choset et al. | |
| 6,840,588 B2 | 1/2005 | Deland | 2010/0030377 A1 | 2/2010 | Unsworth | |
| 6,866,671 B2 | 3/2005 | Tierney | 2010/0174422 A1 | 7/2010 | Jacobsen et al. | |
| 6,870,343 B2 * | 3/2005 | Borenstein et al. ...... 318/568.16 | 2010/0201185 A1 | 8/2010 | Jacobsen et al. | |
| 6,917,176 B2 * | 7/2005 | Schempf et al. ......... 318/568.11 | 2010/0201187 A1 | 8/2010 | Jacobsen | |
| 6,923,693 B2 | 8/2005 | Borgen | 2010/0317244 A1 | 12/2010 | Jacobsen et al. | |
| 6,936,003 B2 | 8/2005 | Iddan | 2010/0318242 A1 | 12/2010 | Jacobsen et al. | |
| 6,959,231 B2 | 10/2005 | Maeda | | | | |
| 7,020,701 B1 | 3/2006 | Gelvin et al. | | | | |
| 7,040,426 B1 | 5/2006 | Berg | FOREIGN PATENT DOCUMENTS | | | |
| 7,044,245 B2 | 5/2006 | Anhalt et al. | CN | 1603068 | 4/2005 | |
| 7,069,124 B1 | 6/2006 | Whittaker et al. | CN | 2774717 | 4/2006 | |
| 7,090,637 B2 | 8/2006 | Danitz | CN | 1970373 | 5/2007 | |
| 7,137,465 B1 | 11/2006 | Kerrebrock | DE | 3025840 | 2/1982 | |
| 7,144,057 B1 | 12/2006 | Young et al. | DE | 3626238 | 2/1988 | |
| 7,171,279 B2 | 1/2007 | Buckingham et al. | DE | 19617852 | 10/1997 | |
| 7,188,473 B1 | 3/2007 | Asada | DE | 19714464 | 10/1997 | |
| 7,188,568 B2 | 3/2007 | Stout | DE | 19704080 | 8/1998 | |
| 7,228,203 B2 | 6/2007 | Koselka et al. | DE | 10018075 | 1/2001 | |
| 7,235,046 B2 | 6/2007 | Anhalt et al. | DE | 102004010089 | 9/2005 | |
| 7,331,436 B1 | 2/2008 | Pack et al. | EP | 0105418 | 4/1984 | |
| 7,387,179 B2 | 6/2008 | Anhalt et al. | EP | 0818283 | 1/1998 | |
| 7,415,321 B2 | 8/2008 | Okazaki et al. | EP | 0924034 | 6/1999 | |
| 7,546,912 B1 | 6/2009 | Pack et al. | EP | 1444043 | 8/2004 | |
| 7,600,592 B2 | 10/2009 | Goldenberg et al. | EP | 1510896 | 3/2005 | |
| 7,645,110 B2 | 1/2010 | Ogawa et al. | EP | 1832501 | 9/2007 | |
| 7,654,348 B2 | 2/2010 | Ohm et al. | EP | 1832502 | 9/2007 | |
| 7,775,312 B2 | 8/2010 | Maggio | FR | 2638813 | 5/1990 | |
| 7,860,614 B1 | 12/2010 | Reger | FR | 2850350 | 7/2004 | |
| 2001/0037163 A1 | 11/2001 | Allard | GB | 1199729 | 7/1970 | |
| 2002/0128714 A1 | 9/2002 | Manasas et al. | JP | 52 57625 | 5/1977 | |
| 2002/0140392 A1 | 10/2002 | Borenstein | JP | 58-89480 | 5/1983 | |
| 2003/0000747 A1 | 1/2003 | Sugiyama | JP | 60015275 | 1/1985 | |
| 2003/0069474 A1 | 4/2003 | Couvillon, Jr. | JP | 60047771 | 3/1985 | |
| 2003/0097080 A1 | 5/2003 | Esashi | JP | 60060516 | 4/1985 | |
| 2003/0110938 A1 | 6/2003 | Seto | JP | 60139576 | 7/1985 | |
| 2003/0223844 A1 | 12/2003 | Schiele | JP | 61001581 | 1/1986 | |
| 2004/0030571 A1 | 2/2004 | Solomon | JP | 61089182 | 5/1986 | |
| 2004/0099175 A1 * | 5/2004 | Perrot et al. ............... 104/138.1 | JP | 63306988 | 12/1988 | |
| 2004/0103740 A1 | 6/2004 | Townsend | JP | 04092784 | 3/1992 | |
| 2004/0168837 A1 | 9/2004 | Michaud | JP | 05147560 | 6/1993 | |
| 2004/0216931 A1 | 11/2004 | Won | JP | 06-115465 | 4/1994 | |
| 2004/0216932 A1 | 11/2004 | Giovanetti | JP | 03535508 | 6/2004 | |
| 2005/0007055 A1 | 1/2005 | Borenstein et al. | JP | 2005111595 | 4/2005 | |
| 2005/0027412 A1 | 2/2005 | Hobson | WO | WO 97/26039 | 7/1997 | |
| 2005/0085693 A1 | 4/2005 | Belson et al. | WO | WO 00/10073 | 2/2000 | |
| 2005/0107669 A1 | 5/2005 | Couvillon, Jr. | WO | WO 02/16995 | 2/2002 | |
| 2005/0166413 A1 | 8/2005 | Crampton | WO | WO 03/30727 | 4/2003 | |
| 2005/0168068 A1 | 8/2005 | Courtemanche et al. | WO | WO 0337515 | 5/2003 | |
| 2005/0168070 A1 | 8/2005 | Dandurand | WO | WO 2005/018428 | 3/2005 | |
| 2005/0225162 A1 | 10/2005 | Gibbins | WO | WO 2006068080 | 6/2006 | |
| 2005/0235898 A1 | 10/2005 | Hobson | WO | WO 2008/049050 | 4/2008 | |

| WO | WO 2008/076194 | 6/2008 |
| WO | WO 2008/135978 | 11/2008 |
| WO | WO 2009/009673 | 1/2009 |

OTHER PUBLICATIONS

U.S. Appl. No. 12/694,996; filed Jan. 27, 2010; Stephen C. Jacobsen; office action mailed Jan. 26, 2011.
PCT Application PCT/US2010/038339; filed Jun. 11, 2010; Stephen C. Jacobsen; ISR mailed Feb. 9, 2011.
U.S. Appl. No. 12/694,996, filed Jan. 27, 2010; Stephen C. Jacobsen; Office Action Issue Sep. 30, 2010.
U.S. Appl. No. 12/151,730, filed May 7, 2008; Stephen C. Jacobsen; Office Action Issued Nov. 15, 2010.
U.S. Appl. No. 12/171,144, filed Jul. 10, 2008; Stephen C. Jacobsen; Office Action Issued Aug. 11, 2010.
U.S. Appl. No. 11/985,324, filed Nov. 13, 2007; Stephen C. Jacobsen; Office Action Issued Nov. 1, 2010.
PCT/US10/38331; filed Jun. 11, 2009; Stephen C. Jacobsen; ISR Issued Dec. 1, 2010.
U.S. Appl. No. 12/820,881; filed Jun. 22, 2010; Stephen C. Jacobsen; office action issued Nov. 30, 2010.
Arnold, Henry, "Cricket the robot documentation." online manual available at http://www.parallaxinc.com, 22 pages.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Hirose, et al., "Snakes and strings; new robotic components for rescue operations," International Journal of Robotics Research, Apr.-May 2004, pp. 341-349, vol. 23, No. 4-5.
Paap et al., "A robot snake to inspect broken buildings," IEEE, 2000, pp. 2079-2082, Japan.
Braure, Jerome, "Participation to the construction of a salamander robot: exploration of the morphological configuration and the locomotion controller", Biologically Inspired Robotics Group, master thesis, 02/17/04, pp. 1-46.
Jacobsen, et al., Advanced intelligent mechanical sensors (AIMS), Proc. IEEE Trandsucers 1991, Jun. 24-27, abstract only, San Fransico, CA.
Jacobsen, et al., "Research robots for applications in artificial intelligence, teleoperation and entertainment", International Journal of Robotics Research, 2004, pp. 319-330, vol. 23.
Jacobsen, et al., "Multiregime MEMS sensor netwoorks for smart structures," Procs. SPIE 6th Annual Inter. Conf. on Smart Structures and Materials, Mar. 1-5, 1999, pp. 19-32, vol. 3673, Newport Beach CA.
MaClean et al., "A digital MEMS-based strain gage for structural health monitoring," Procs, 1997 MRS Fall Meeting Symposium, Nov. 30-Dec. 4, 1997, pp. 309-320, Boston Massachusetts.
Berlin et al., "MEMS-based control of structural dynamic instability", Journal of Intelligent Material Systems and Structures, Jul. 1998 pp. 574-586, vol. 9.
Goldfarb, "Design and energetic characterization of a liquid-propellant-powered actuator for self-powered robots," IEEE Transactions On Mechatronics, Jun. 2003, vol. 8 No. 2.
Dowling, "Limbless Locomotion: Learning to crawl with a snake robot," The Robotics Institute at Carnegie Mellon University, Dec. 1997, pp. 1-150.
Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proceedings/SESSION%2026/m116-Heverly.pdf.
NASA: "Nasa's newest concept vehicles take off-roading out of this world" Internet article, Nov. 5, 2008, http://www.nasa.gov/mission_pages/constellation/main/lunar_truck.html.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.
Ren Luo "Development of a multibehavior-based mobile robot for remote supervisory control through the internet" IEEE/ ASME Transactions on mechatronics, IEEE Service Center, Piscataway NY, Dec. 1, 2000, vol. 5, No. 4.
Nilas Sueset et al., "A PDA-based high level human-robot interaction" Robotics, Automation and Mechatronics, IEEE Conference Singapore, Dec. 1-3, 2004, vol. 2, pp. 1158-1163.
U.S. Appl. No. 12/765,618; filed Apr. 22, 2010; Stephen C. Jacobsen; office action issued Apr. 06, 2011.
U.S. Appl. No. 11/985,320; filed Nov. 13, 2007; Stephen C. Jacobsen; office action issued Apr. 12, 2011.
U.S. Appl. No. 11/985,324; filed Nov. 13, 2007; Stephen C. Jacobsen; notice of allowance issued Apr. 18, 2011.
U.S. Appl. No. 12/151,730; filed May 07, 2008; Stephen C. Jacobsen; notice of allowance issued Apr. 15, 2011.
U.S. Appl. No. 11/985,336; filed Nov. 13, 2007; Stephen C. Jacobsen; office action issued Jun. 14, 2011.
U.S. Appl. No. 11/985,320; filed Nov. 13, 2007; Stephen C. Jacobsen; office action issued Aug. 17, 2011.

* cited by examiner

SERPENTINE ROBOTIC CRAWLER

RELATED APPLICATIONS

This application is a continuation of U.S. patent application Ser. No. 11/985,323, filed Nov. 13, 2007, and entitled "Serpentine Robotic Crawler", which claims the benefit of U.S. Provisional Patent Application No. 60/858,917, filed Nov. 13, 2006, each of which is incorporated by reference in its entirety herein.

FIELD OF THE INVENTION

The present invention relates to small, unmanned ground robotic vehicles. More particularly, the present invention relates to a serpentine robotic crawler having multiple tracked frame units interconnected through a high-degree of freedom actuated linkage.

BACKGROUND OF THE INVENTION AND RELATED ART

Robotics is an active area of research, and many different types of robotic vehicles have been developed for various tasks. For example, unmanned aerial vehicles have been quite successful in military aerial reconnaissance. Less success has been achieved with unmanned ground vehicles, however, in part because the ground environment is significantly more difficult to traverse than the airborne environment.

Unmanned ground vehicles face many challenges when attempting mobility. Terrain can vary widely, including for example, loose and shifting materials, obstacles, vegetation, limited width or height openings, steps, and the like. A vehicle optimized for operation in one environment may perform poorly in other environments.

There are also tradeoffs associated with the size of vehicle. Large vehicles can handle some obstacles better, including for example steps, drops, gaps, and the like. On the other hand, large vehicles cannot easily negotiate narrow passages or crawl inside pipes, and are more easily deterred by vegetation. Large vehicles also tend to be more readily spotted, and thus are less desirable for discrete surveillance applications. In contrast, while small vehicles are more discrete, surmounting obstacles becomes a greater navigational challenge.

A variety of mobility configurations have been adapted to traverse difficult terrain. These options include legs, wheels, and tracks. Legged robots can be agile, but use complex control mechanisms to move and achieve stability. Wheeled vehicles can provide high mobility, but provide limited traction and require width in order to achieve stability.

Tracked vehicles are known and have traditionally been configured in a tank-like configuration. While tracked vehicles can provide a high degree of stability in some environments, tracked vehicles typically provide limited maneuverability with very small vehicles. Furthermore, known tracked vehicles are unable to accommodate a wide variety of obstacles, particularly when the terrain is narrow and the paths are tortuous and winding.

SUMMARY OF THE INVENTION

The present invention includes a serpentine robotic crawler which helps to overcome problems and deficiencies inherent in the prior art. In one embodiment, the serpentine robotic crawler includes a first frame and a second frame, each frame having a continuous track rotatably supported therein. The first and second frame are coupled by an actuated linkage arm. The linkage arm has a pair of wrist-like actuated linkage at each end, coupled to respective frames, and an elbow-like actuated joint between the wrist-like actuated linkages.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, can be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Figure 1:
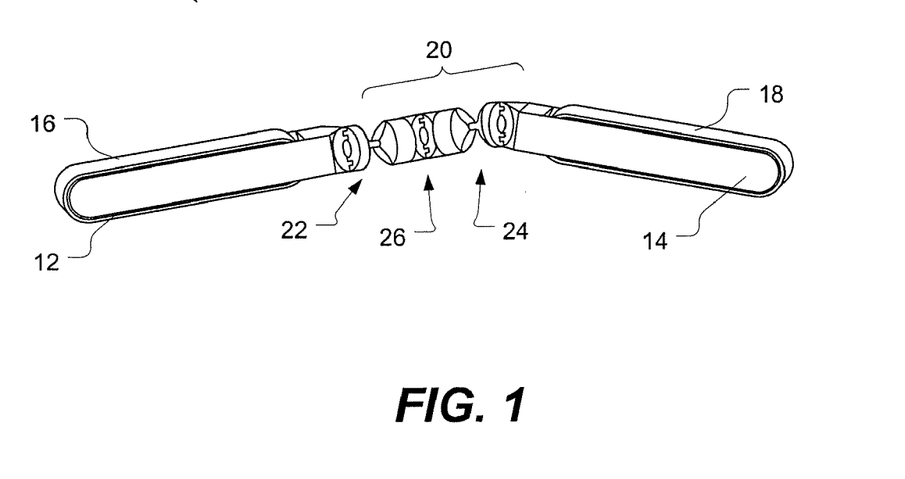
FIG. 1 illustrates a perspective view of a serpentine robotic crawler according to a an exemplary embodiment of the present invention.

With reference to FIG. 1, shown is an illustration of a serpentine robotic crawler according to a first exemplary embodiment of the present invention. Specifically, FIG. 1 illustrates the serpentine robotic crawler 10 as including a first frame 12 and a second frame 14. Each frame includes a continuous track 16, 18 rotatably supported by the frame. The frames are coupled together by a multiple degree of freedom actuated linkage arm 20. The multiple degree of freedom linkage arm includes a first wrist-like actuated linkage 22 coupled to the first frame, a second wrist-like actuated linkage 24 coupled to the second frame, and an elbow-like actuated joint 26 coupled between the first and second wrist-like actuated linkage.

Figure 2:
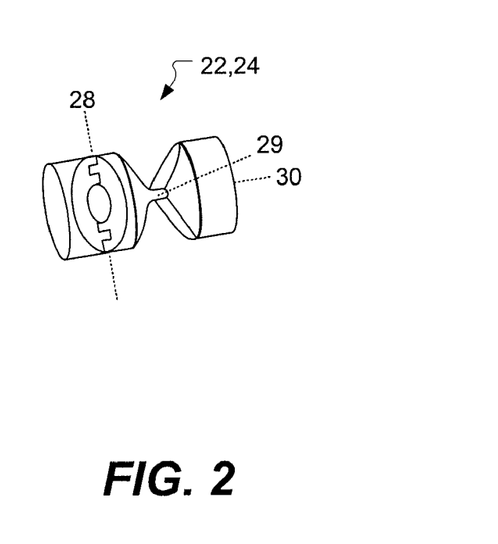
FIG. 2 illustrates a perspective view of a wrist-like actuated linkage in accordance with an embodiment of the present invention.
Figure 3:
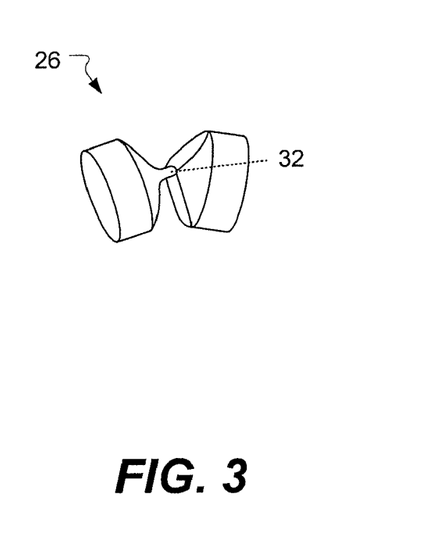
FIG. 3 illustrates a perspective view of an elbow-like actuated linkage in accordance with an embodiment of the present invention.

The wrist-like actuated linkages 22, 24, shown in further detail in FIG. 2, provide bending movement about two different lateral axes 28, 29 and rotational movement about a longitudinal axis 30. Longitudinal refers to a direction generally oriented along the actuated linkage, such that movement about a longitudinal axis corresponds to twisting or rotational movement. Lateral refers to a direction generally oriented perpendicularly or at an angle to the longitudinal axis, such that movement about a lateral axis corresponds to bending movement. The two different lateral axes can be, but are not limited to, being at right angles to each other. The elbow-like actuated joint, shown in further detail in FIG. 3, provides bending movement about a lateral axis 32.

Figure 4:
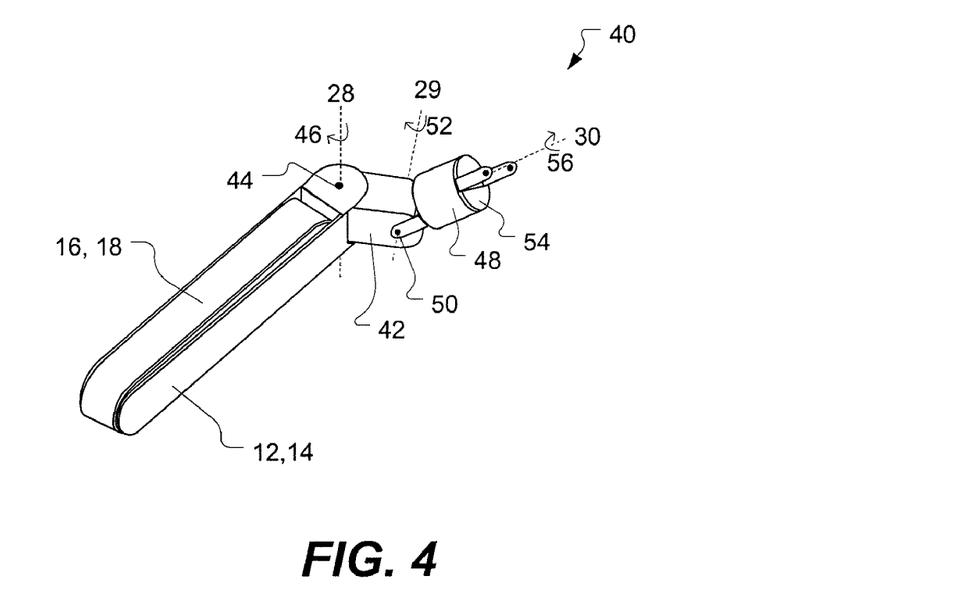
FIG. 4 illustrates a perspective view of a wrist-like actuated linkage in accordance with an embodiment of the present invention.

The wrist-like actuated linkages 22, 24 can be configured in various ways. For example, the wrist-like actuated linkage can include a series coupled combination of a yaw bending joint, a pitch bending joint, and a rotational joint, with various arm linkages coupled between the joints and the frame. For example, as shown in FIG. 4, in accordance with an embodiment of the present invention, a wrist-like actuated linkage 40 can include a yaw arm 42 coupled to the frame 12,14 through a yaw bending joint 44 which provides yaw 46 bending about a lateral axis 28 orientated substantially vertically relative to the frame when the continuous track 16, 18 is in a nominal operating position and in contact with a substantially horizontal supporting surface. The wrist-like actuated linkage can also include a pitch arm 48 coupled to the yaw arm through a pitch bending joint 50 providing pitch 52 bending about a lateral axis 29 oriented substantially horizontally relative to the frame. The wrist-like actuated linkage can also include a rotary joint 54 providing roll 56 rotation about the longitudinal axis 30 of the pitch arm. References to vertical and horizontal refer to nominal directions relative to a substantially horizontal supporting surface on which the serpentine robotic crawler is operated and when the continuous track is in contact with the supporting surface. It will be appreciated that, when the serpentine robotic crawler is tipped over, the vertical direction relative to the serpentine robotic crawler is actually horizontal relative to the supporting surface.

Figure 5:
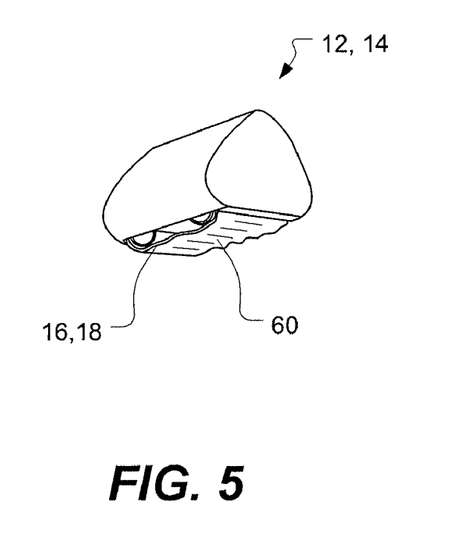
FIG. 5 illustrates a perspective view of a frame having a substantially enclosed continuous track with an exposed bottom portion in accordance with an embodiment of the present invention.
Figure 6:
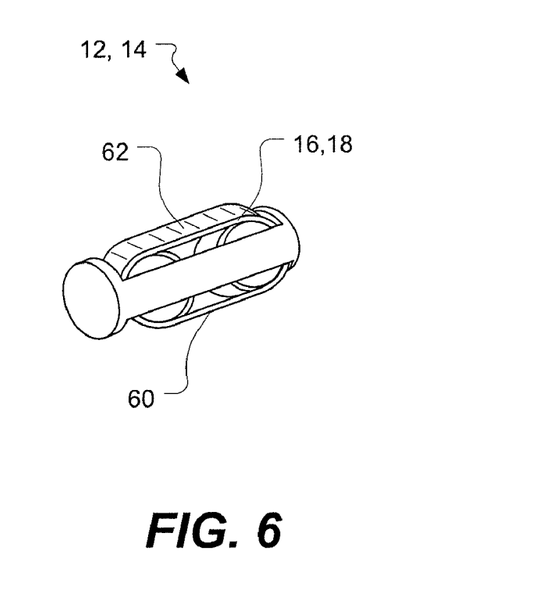
FIG. 6 illustrates a perspective view of a frame having a continuous track with an exposed top portion and an exposed bottom portion in accordance with an embodiment of the present invention.

Considering the frames 12, 14 and continuous tracks 16, 18 in further detail, the frame can be configured in various ways so that the continuous track is substantially enclosed so that only a bottom portion 60 is exposed as illustrated in FIG. 5, or so that the continuous track is partially enclosed so that a top portion 62 and bottom portion 60 of the continuous track 16, 18 are exposed as illustrated in FIG. 6. Note that, where both the top and bottom portion of the continuous track is exposed, the frame can be oriented with either side up and still provide locomotion. The benefits of this configuration will become more apparent as the operation of a serpentine robotic crawler is discussed further below. The frame can include a drive (not shown) coupled to the continuous track to drive the continuous track. Optionally, the drive can be configured to drive the continuous track in either direction (e.g., clockwise and counterclockwise) over a range of speeds. Various types of drives and coupling techniques for applying drive power to a continuous track are known and can be applied in embodiments of the present invention.

Referring back to FIG. 1, the combination of the high degree of freedom actuated linkage arm 20 with the dual single track frames 12, 14 makes the serpentine robotic crawler 10 capable of many different modes of movement as will now be described. Operating the serpentine robotic crawler can include articulating the actuated multi-degree of freedom linkage arm to establish a desired pose for the serpentine robotic crawler. Drive operation of the continuous tracks 16, 18 can be coordinated with articulation of the high degree of freedom actuated linkage arm to further control the pose and provide movement of the serpentine robotic crawler. When establishing a pose of the serpentine robotic crawler, torque and forces on the joints may be taken into account as discussed further herein.

Figure 7:
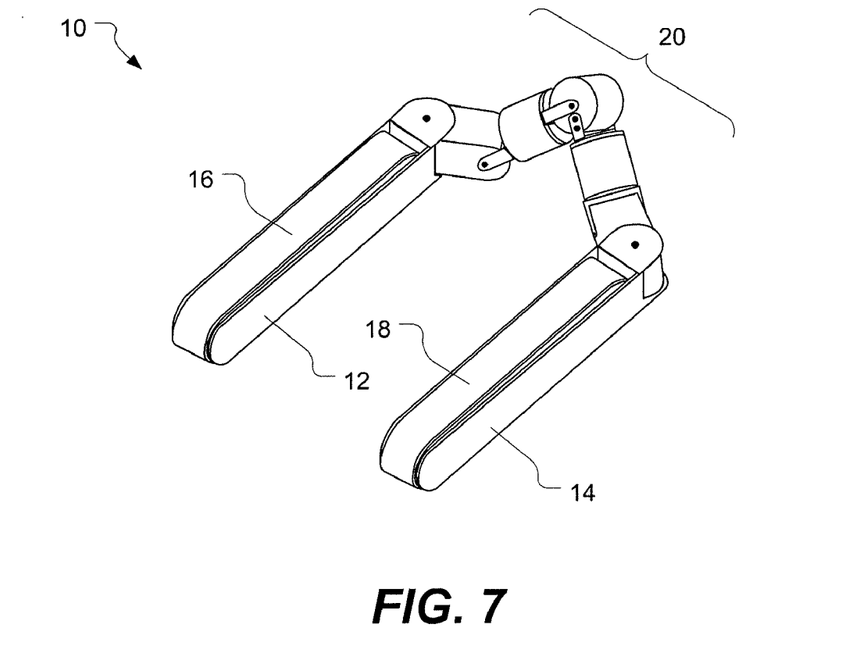
FIG. 7 illustrates a perspective view of a serpentine robotic crawler in a tank-like configuration in accordance with an embodiment of the present invention.

A first pose will be referred to herein as the "tank" configuration, where the first frame 12 and second frame 14 are positioned side by side as illustrated in FIG. 7. The frames extend in the same direction from the actuated linkage arm 20, and can be, but need not be, parallel. The tank configuration provides lateral stability to the serpentine robotic crawler 10, for example when traversing a steep slope. The serpentine robotic crawler can be moved in a forward and reserve direction by driving the continuous tracks 16, 18 in the same direction, and turned by driving the continuous tracks in the opposite direction. In general, moving the serpentine robotic crawler in the tank-like configuration can involve applying different drive speeds (including opposite directions) to the continuous tracks.

Figure 8:
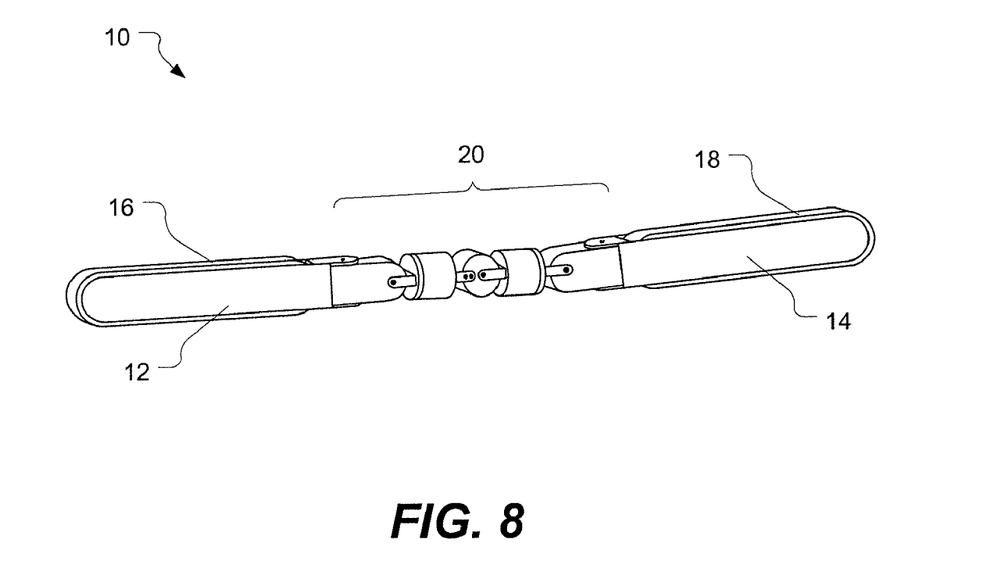
FIG. 8 illustrates a perspective view of a serpentine robotic crawler in a snake-like configuration in accordance with an embodiment of the present invention.

A second pose, referred to herein as the "train" configuration, is where the first frame 12 and second frame 14 are aligned end-to-end as illustrated in FIG. 8. The frames can be, but need not be, parallel. The train configuration provides a smaller profile, allowing the serpentine robotic crawler 10 to enter small holes, pipes, tunnels, and the like. The train configuration also allows the serpentine robotic crawler to bridge gaps and holes. In the train configuration, forward and reverse motion is provided by driving the continuous tracks 16, 18.

Note that, relative to the tank configuration, the direction sense of one of the continuous tracks is reversed. Turning of the serpentine robotic crawler can be provided by operation of the actuated linkage arm 20 to create an angle between the first frame and second frame.

Figure 9:
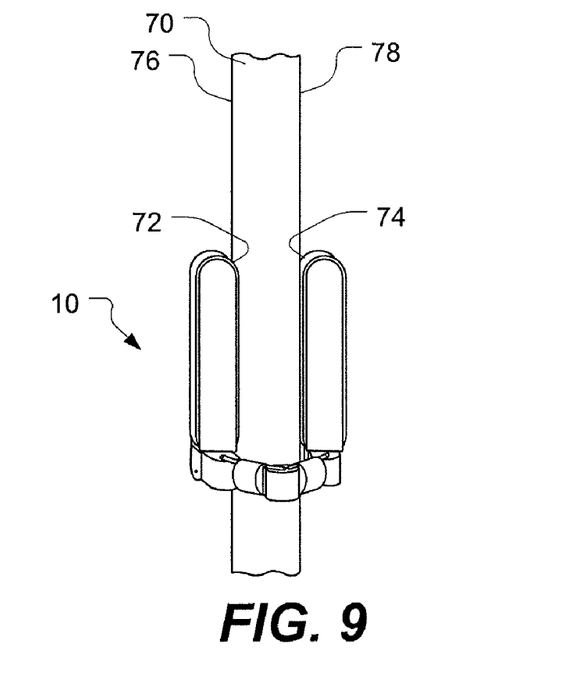
FIG. 9 illustrates a perspective view of a serpentine robotic crawler in an outside-climbing configuration in accordance with an embodiment of the present invention.

The serpentine robotic crawler can also be configured for climbing the exterior of structure. As illustrated in FIG. 9, the serpentine robotic crawler 10 is wrapped around the structure 70 so that exposed portions 72, 74 of the continuous tracks face toward each other and contact opposite outer surfaces 76, 78 of the structure. The continuous tracks can be driven to move the serpentine robotic crawler up and down the structure. Many different structural geometries, including for example a pole, can be climbed in this outside-climbing configuration.

Figure 10A:
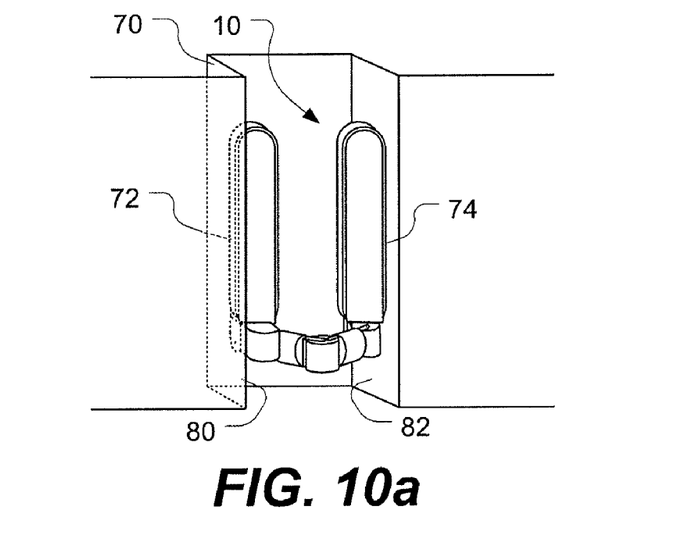
FIGS. 10(a)-10(c) illustrate perspective views of a serpentine robotic crawler in different inside-climbing configurations in accordance with an embodiment of the present invention.
Figure 10B:
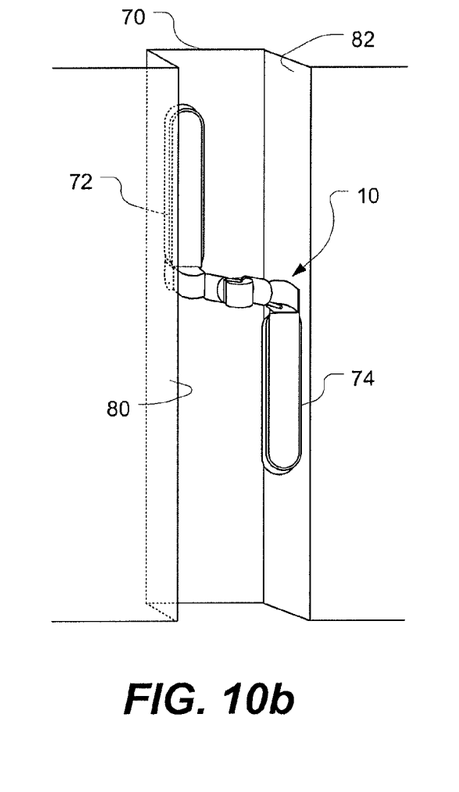

The serpentine robotic crawler can also be configured for climbing the interior of a structure. FIGS. 10(*a*) and 10(*b*) illustrate two different inside-climbing configurations. In an inside-climbing configuration, the serpentine robotic crawler 10 is configured so that exposed portions 72, 74 of the continuous tracks face away from each other and are in contact with opposite inner surfaces 80, 82 of the structure 70. The inside-climbing configuration can be useful for climbing pipes, chimneys, wall interiors, and the like.

Figure 10C:
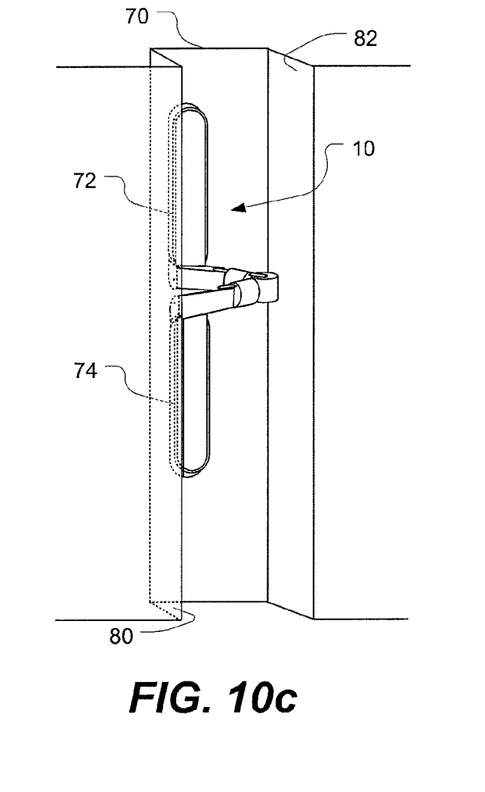

It may also be possible for the serpentine robotic crawler to climb the interior of a structure 70 by facing exposed portions 72, 74 of the continuous tracks in the same direction, in contact with the same inner surface 80 of the structure, and placing a portion of the actuated linkage in contact with the opposite inner surface 82, as illustrated in FIG. 10(*c*).

Figure 11:
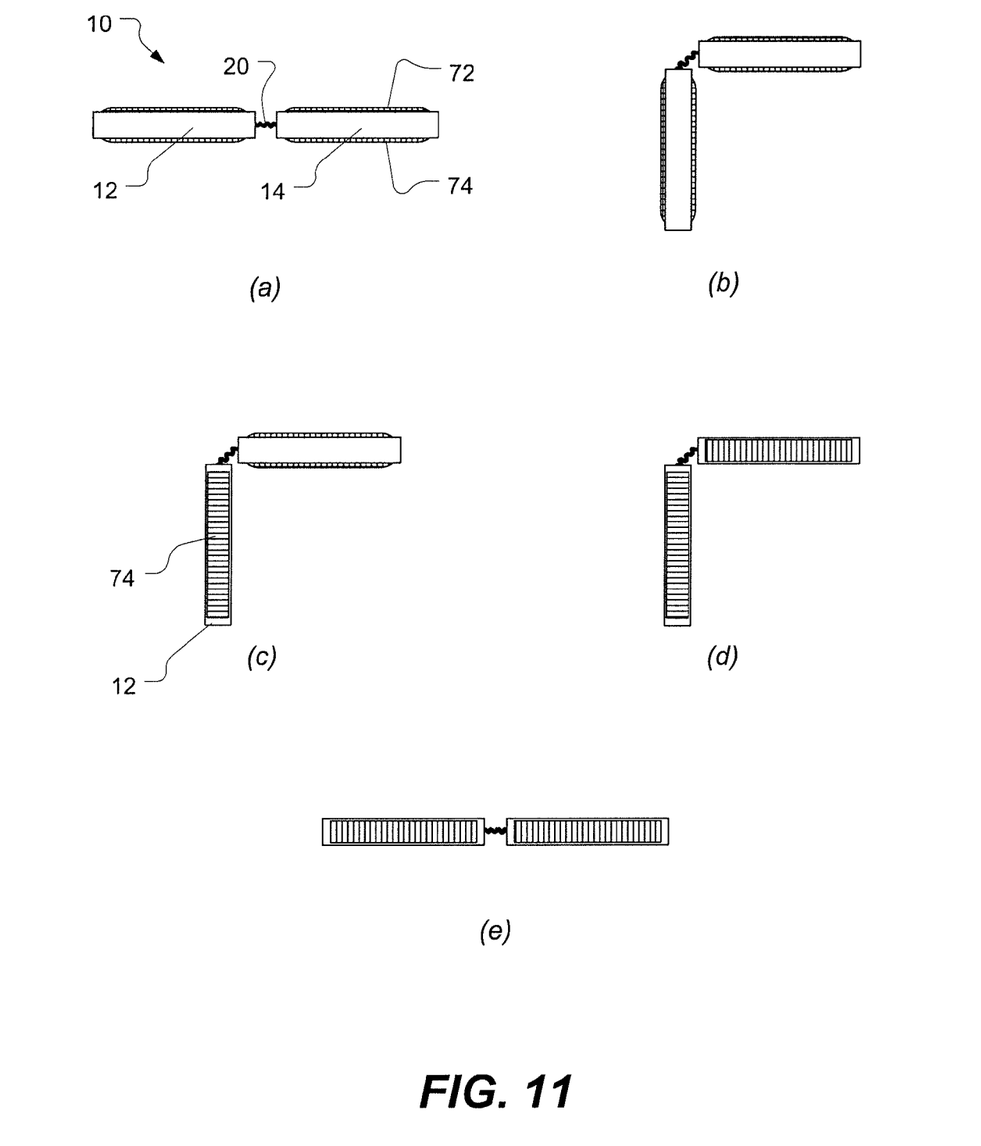
FIGS. 11(a)-11(e) illustrate a top view of a sequence of movements of a serpentine robotic crawler righting itself in accordance with an embodiment of the present invention.

Various articulated movements are also possible for the serpentine robotic crawler. For example, FIGS. 11(*a*)-11(*e*), illustrate one technique self-righting of an overturned serpentine robotic crawler in overhead view. The serpentine robotic crawler 10 is shown lying on its side in FIG. 11(*a*), with the exposed portions 72, 74 of the continuous track no longer in contact with the surface. In a first step, the actuated linkage 20 is activated to position the frames at an approximately 90-degree angle as shown in FIG. 11(*b*). This provides a stable configuration, at which point one of the wrist-like joints can be rotated to place one of exposed surfaces of a continuous track in contact with the surface as shown in FIG. 11(*c*). The other wrist-like joint is then rotated to similarly position the other frame as shown in FIG. 11(*d*). As this point, both continuous tracks are in contact with the surface. The linkage arm is then straightened so that the serpentine robotic crawler can continue on as shown in FIG. 11(*e*). Optionally, straightening the linkage arm can occur while the serpentine robotic crawler has begun moving forward. The serpentine robotic crawler can include systems such as track load sensors, inertial references, and the like to assist in determining and correcting its orientation. For example, commonly owned and co-pending U.S. Provisional Patent Application No. 60/858, 805, entitled "Conformable Track Assembly for a Robotic Crawler", filed Nov. 13, 2006 and incorporated herein by reference, describes a suspension system for an endless track which includes a deflector and a load-sensing element which can be used in embodiments of the present invention.

Other self-righting movement modes are also possible. For example, the serpentine robotic crawler 10 can be placed into an arched configuration by operating the actuated linkage arm 20 (as described further below) so the serpentine robotic crawler is substantially supported by only furthest apart ends of the tracks. This configuration can be unstable, allowing further actuation of the articulated linkage arm to cause the serpentine robotic crawler to tip over.

Figure 12:
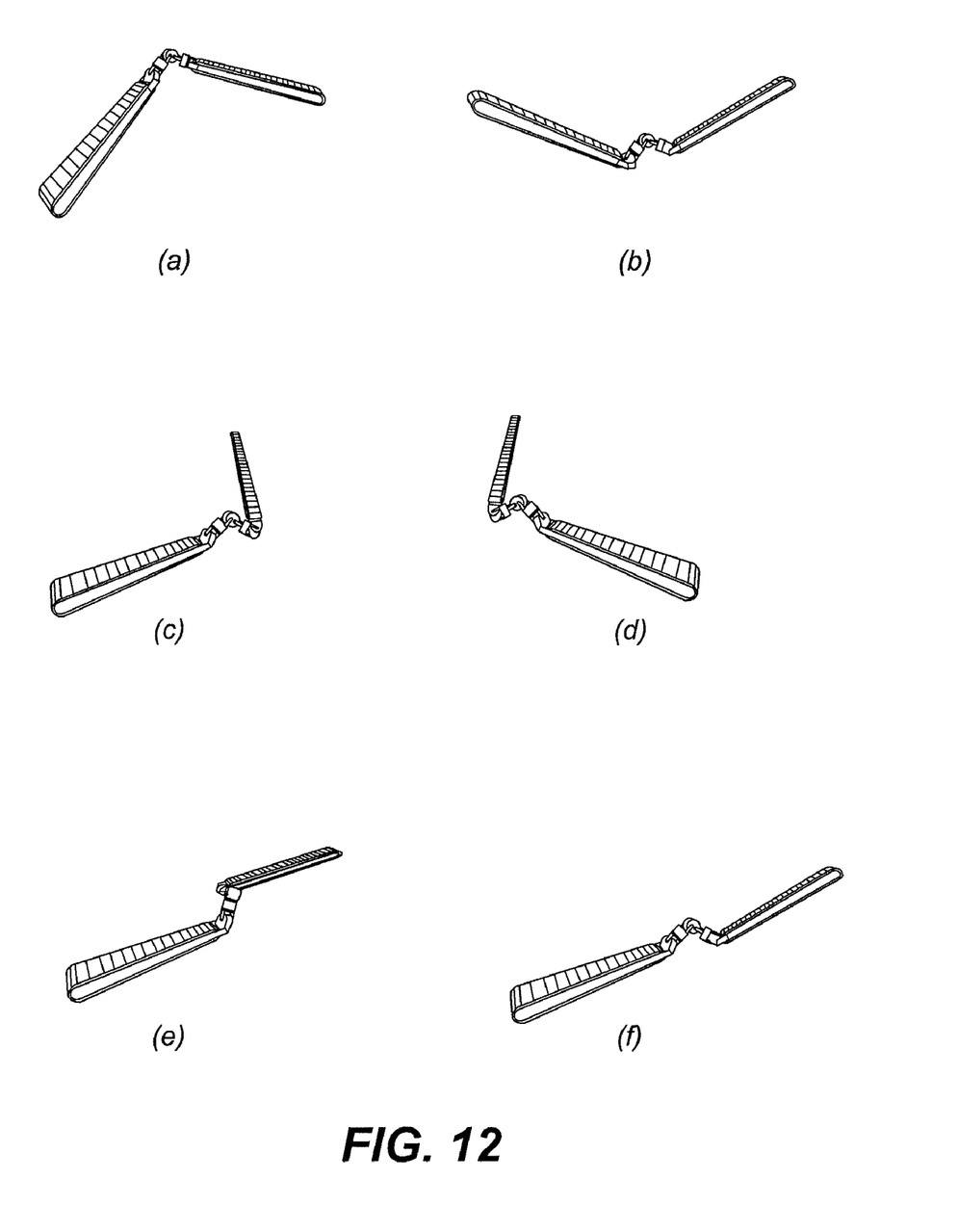
FIGS. 12(a)-12(f) illustrate perspective views of various poses for a serpentine robotic crawler in accordance with an embodiment of the present invention.

A serpentine robotic crawler in accordance with embodiments of the present invention is capable of a large number of poses and movement modes not possible with more conventional wheeled or tracked vehicles. Additional poses the serpentine robotic crawler 10 can adopt are illustrated in FIG. 12(*a*)-12(*f*). For example, the actuated linkage 20 can position the frames 12, 14 at an angle relative to each other. The serpentine robotic crawler can thus be arched in an up (FIG. 12(*a*)), down (FIG. 12(*b*)), left (FIG. 12(*c*)), or right (FIG. 12(*d*)) direction. Arching up and down can help to navigate uneven portions of terrain, such as dips and bumps. Arching left and right can help in turning and avoiding obstacles.

Another pose can be referred to as a zag configuration, where the frames are oriented in parallel lines but offset and extending in opposite directions from the actuated linkage arm, as shown in FIG. 12(*e*). Similar to the tank configuration, the zag configuration can provide additional stability to the serpentine robotic crawler.

While the various poses have been described in a static sense, it will be understood that the serpentine robotic crawler can dynamically vary its pose as it is operated. Moreover, modified versions of the above poses may also prove useful, depending on the environment in which the serpentine robotic crawler operates.

As discussed above, various dynamic movement modes are possible. While the foregoing discussion has principle focused on operation of the endless tracks to provide propulsion, it will be appreciated that operation of the actuated linkage can also assist in propulsion. For example, sudden jerky movements of the actuated linkage can help to provide traction or to free the serpentine robotic crawler when entangled. As another example, the spatial orientation of the tracks can be periodically or continuously adjusted by the actuated linkage to conform to a surface being traveled over. For example, FIG. 12(*f*) illustrates a twisted configuration.

Returning to the discussion of the articulated multi-degree of freedom linkage arm 20, various other configurations are also possible for embodiments of a serpentine robotic crawler. In general, the linkage arm includes at least seven actuated joints providing motion about seven different axes (although some of these axes may be aligned with each other at times). These joints can be uni-axial, bi-axial, or tri-axial joints. The linkage arm can include a series coupled combination of any of the following:

7 uni-axial joints
3 three uni-axial joints and 2 bi-axial joints
1 uni-axial joint and 2 tri-axial joints
2 bi-axial joints and 1 tri-axial joint For example, the linkage arm can include a series combination of five actuated uni-axial bending joints and two actuated uni-axial rotary joints, wherein the bending joints provide at least two different joint axes. For example, four bending joints can be symmetrically disposed about a fifth bending joint located in the center of the linkage, two bending joints on each side of the center. The rotary joints can also be symmetrically disposed about the center. For example, the rotary joints can be located adjacent to the fifth (centered) bending joint (e.g., as illustrated in FIG. 7), located between the symmetrically disposed bending joints, or located adjacent to the frames.

Alternately, bi-axial joints, which provide the same degrees of freedom as two uni-axial joints in series, or tri-axial joints, which provide the same degrees of freedom as three uni-axial joints in series, can also be used. A bi-axial joint can, for example, provide bending in two axes. These axes can, but need not be, orthogonal. A tri-axial joint can, for example, provide bending in two lateral axes and rotation about a third longitudinal axis.

Joints need not be limited to revolute joints which provide bending or rotational movement. Prismatic joints which provide translational movement can also be included. Joints may incorporate both revolute and prismatic features to provide, for example, eccentric motions.

Figure 13:
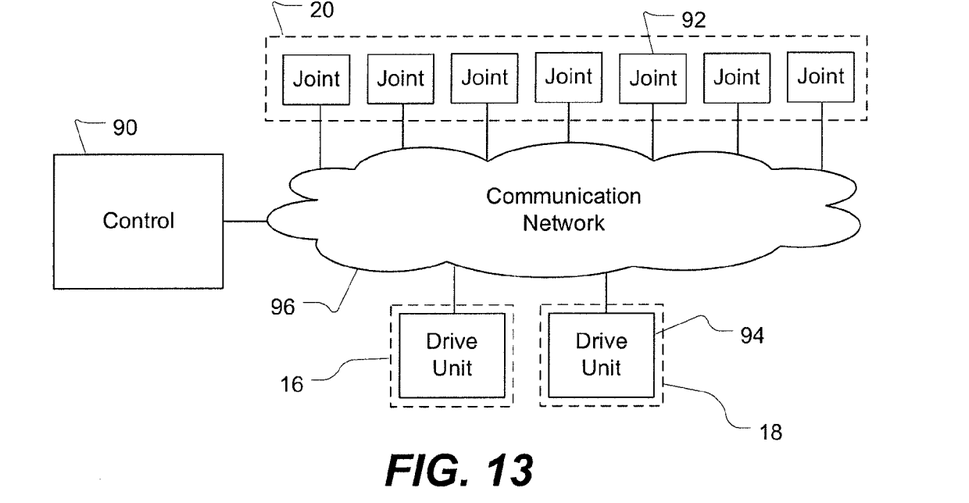
FIG. 13 illustrates a schematic diagram of a control system in accordance with an embodiment of the present invention.

Control of the serpentine robotic vehicle 10 will now be discussed in further detail. As noted above, movement and pose of the serpentine robotic vehicle can be controlled through articulation of the actuated multiple degree of freedom linkage arm 20 and rotation of the continuous tracks 16, 18. Accordingly, as shown in schematic form in FIG. 13, the serpentine robotic crawler can include a control subsystem 90. The control subsystem is in communication with each of the actuated joints 92 of the linkage arm 20 to control the pose of the serpentine robotic crawler. The control system can also be in communication with the drive units 94, which are coupled to the first and second continuous track, to control the speed and direction of continuous track rotation to control movement of the serpentine robotic crawler. The control system can also include a communication network 96 configured to exchange communication between the control subsystem, the joints in the linkage arm, and the drive units.

Various implementations of the communications network are possible. For example, various communications protocols are known which allow a large number of nodes to communicate on a limited number of wires, including for example RS-485, RHAMIS, USB, Ethernet, and the like. Alternately, the communications network can include wireless components. For example, the communication network can include a wireless portion providing communication between the serpentine robotic crawler and a control system located remotely from the serpentine robotic crawler.

Various implementations of the control subsystem are possible. For example, in one embodiment, the control system can use a master replica for control of the serpentine robotic crawler. In a master replica control system, a master replica is located remotely from the serpentine robotic crawler. The master replica contains the same joints as the serpentine robotic crawler, and is manually manipulated into the desired poses. Sensors located at the joints sense the position of the joints, and these positions are communicated to the serpentine robotic crawler which actuates its joints to attempt to establish the same pose. Optionally, the joints in the serpentine robotic crawler can include force sensors, torque sensors, or both, allowing the force and/or torque on the joints to be measured. The joint forces and/or torques can optionally be communicated back to the replica master, providing force feedback into the control system. Various force feedback control systems are known which can be applied to embodiments of the present invention.

The control system may be integrated into the serpentine robotic crawler thereby allowing the crawler to operate autonomously. For example, the crawler may operate autonomously for an extended period of time. In an embodiment, the control system can include distributed joint and track controllers which locally control one or more closely associated joints. Distributed joint and track controllers can communicate with a master controller located within the crawler or located externally from the crawler.

In another embodiment, control of the serpentine robotic crawler can include control of a first frame, with other frames slaved to the first frame. For example, an operator can control the orientation and movement of the first frame. The other frames then follow the first frame. One particular control scheme can include automatically steering the other frames in following the first frame so as to minimize forces imposed on the actuated linkage arm.

As another example, control of the serpentine robotic crawler can include use of a joystick. For example, a two-dimensional joystick can be used to control a pose of the robot, for example by controlling motion of the actuated linkage via the joystick. Movement of the two-degrees of motion in the joystick can be translated into complex movements of the multi-degree of freedom actuated linkage via predefined primitives. As a particular example, movement of the joystick to the left or right can arch the serpentine robotic crawler to the left or right, with sustained holding of the joystick moving the serpentine robotic crawler between a tank-like configuration and a snake-like configuration. As another particular example, movement of the joystick to the front or back can arch the serpentine robotic crawler up or down, with sustained holding of the joystick forward or backward placing the serpentine robotic crawler into an inside- or outside-climbing configuration. Of course, a variety of mappings from a joystick to movements can be defined, as will be appreciated. Interface between an operator and the control system can be provided via a menu driven interface operational on a personal computer, laptop, personal data assistant, and the like, as is known.

The control system can also be configured to provide a degree of compliance in the joints. For example, forces applied to the joints by the environment of the flexible robotic crawler can be sensed and communicated to the control system. When certain force thresholds are exceeded, the joints can be allowed to move. For example, joints can include breakaway clutches, implemented either via mechanical systems, electronic systems, or hybrid electro-mechanical systems. Force limit thresholds can be made adjustable to provide variable compliance to the serpentine robotic crawler. For example, high thresholds to provide a stiff posture may prove useful in pushing through certain types of obstructions. Alternately, low thresholds may prove useful in bending around other types of obstructions.

As another example, the control system can be implemented using a processing system. Various movement primitives can be preprogrammed, including for example primitives to assume certain poses (e.g., tank, zag, arched, train, or climbing configurations), and primitives for movement (e.g., forward, backwards). Control can include feedback from joint force sensors and environmental sensors. Hybrid human and automated control can be combined. For example, high-level manual commands/primitives can be implemented using automated low-level feedback loops that execute the commands/primitives. Control function can be divided into subsystems, including for example, pose control, compliance control, movement control, force control, and hybrid combinations thereof.

Figure 14:
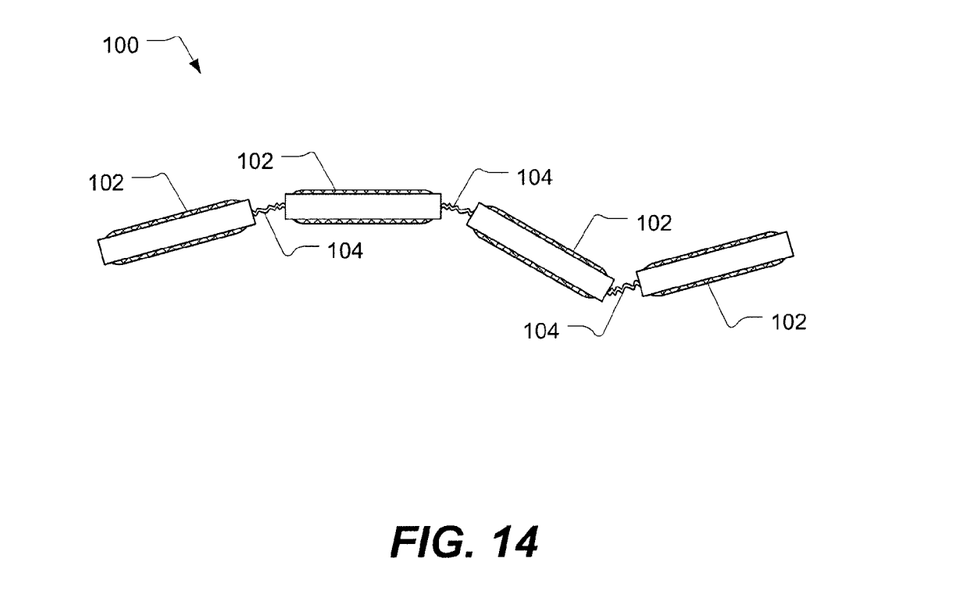
FIG. 14 illustrates a serpentine robotic crawler in accordance with an alternate embodiment of the present invention.

An alternate configuration of a serpentine robotic crawler is illustrated in FIG. 14 in accordance with an embodiment of the present invention. The serpentine robotic crawler 100 includes a plurality of frame units 102, each having a continuous track rotatably supported therein. For example, the continuous track can have one or more exposed surfaces, as discussed above. At least one actuated multi-degree of freedom linkage arm 104 is coupled between the frame units. For example, with N frame units, N 1 linkage arms are used to intercouple the frames into a multi-frame train. The actuated multi-degree of freedom linkage arm includes at least seven joint axes, for example as described above. Optionally, the actuated multi-degree of freedom linkage arm can be removably connected between the frame units, to allow the multi-frame train to be reconfigured, for example into a number of individual frames, pairs of frames, or shorter multi-frame trains.

Figure 15:
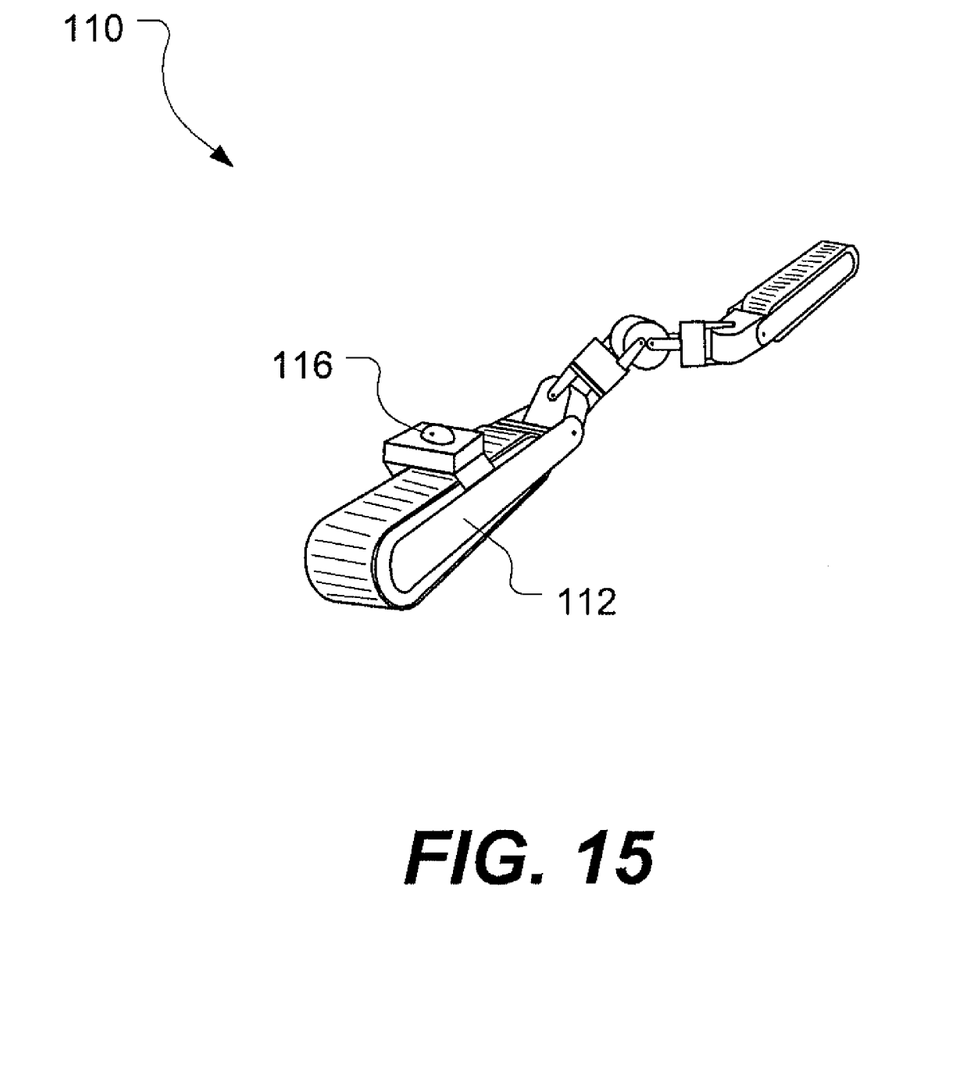
FIG. 15 illustrates a serpentine robotic crawler in accordance with yet another alternate embodiment of the present invention.

A serpentine robotic crawler can also include various sensors or tools positioned on the actuated multi-degree of freedom linkage arm and or the frame. For example, as illustrated in FIG. 15, a serpentine robotic crawler 110 can have cameras 116 disposed on one 112 of the frames. As another example, cameras can be disposed on both the leading and the trailing frame. For example, a front camera can be used primarily for scanning the environment, and a rear camera can be used for observing the pose of the serpentine robotic crawler for control purposes. Other sensors, including for example, radar, lidar, infrared detectors, temperature sensors, chemical sensors, force sensors, motion detectors, microphones, antennas, and the like can be disposed on the serpentine robotic crawler. As another example, tools, including for example, light sources, clamps, grippers, manipulators, cutters, drills, material samplers, and the like can also be disposed on the serpentine robotic crawler. As another example, the serpentine robotic crawler can include articulated arms disposed on the frame. Commonly owned and co-pending U.S. Provisional Patent Application No. 60/858,915, entitled "Tracked Robotic Vehicle with Articulated Arms," filed Nov. 13, 2006, describes a serpentine robotic crawler having articulated arms, and is herein incorporated by reference.

Summarizing and reiterating to some extent, serpentine robotic crawlers in accordance with embodiments of the present invention can be deployed in a variety of applications and environments. For example, and not by way of limitation, applications can include search and rescue, military operations, and industrial operations. The serpentine robotic crawler can help to avoid the need to expose humans to hazardous environments, such as unstable buildings, military conflict situations, and chemically, biologically, or nuclear contaminated environments. The configurational flexibility of the serpentine robotic crawler provides multiple movement modes. For example, movement in a tank-like configuration can provide high stability. Movement in a snake-like configuration can provide access through narrow passages or pipes. Climbing the outside of structures, e.g., a pole, and climbing the inside of structures, e.g., inside a pipe, are also possible.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Accordingly, the scope of the invention should be determined solely by the appended claims and their legal equivalents, rather than by the descriptions and examples given above.

What is claimed is:

1. A serpentine robotic crawler comprising:
   a first frame having a first continuous track rotatably supported by the first frame;
   a second frame having a second continuous track rotatably supported by the second frame; and
   a linkage arm coupling the first and second frames together in tandem and being actuated about at least one lateral axis and at least two longitudinal axes, which longitudinal axes are oriented by the actuated bending movement of the linkage arm about the at least one lateral axis.

2. The robotic crawler of claim 1, wherein the linkage arm comprises:
   a first actuated rotary joint operable with the first frame to provide a first longitudinal axis;
   a second actuated rotary joint operable with the second frame to provide a second longitudinal axis;
   an actuated bending joint operable between each of the first and second rotary joints to provide controlled bending about the lateral axis.

3. The robotic crawler of claim 2, wherein the linkage arm further comprises at least one additional actuated bending joint operable with each of the first and second frames, respectively, with each additional bending joint providing controlled bending about an additional lateral axis.

4. The robotic crawler of claim 2, wherein the linkage arm further comprises an additional pair of actuated bending joints positioned between the first and second actuated rotary joints and each of the first and second frames, respectively, with each additional bending joint providing controlled bending about an additional lateral axis.

5. The robotic crawler of claim 4, wherein the lateral axes of each additional pair of actuated bending joints are at substantially right angles to each other.

6. The robotic crawler of claim 2, wherein each of the first and second frames further comprises a drive coupled to the continuous track.

7. The robotic crawler of claim 6, further comprising a control subsystem in communication with each drive and with each rotary and bending joint in the linkage arm and configured to selectively actuate each drive, rotary joint and bending joint to control the pose of robotic crawler.

8. A serpentine robotic crawler comprising:
   at least two frame units each having a continuous track rotatably supported thereon; and
   at least one multi-degree of freedom actuated linkage arm coupled between the frame units, the linkage arm comprising:
      at least three actuated bending joints, each providing bending about a lateral axis; and
      at least two actuated rotary joints, each providing rotation about a longitudinal axis,
      wherein the linkage arm comprises a series-coupled combination of at least five actuated joints.

9. The robotic crawler of claim 8, wherein the linkage arm further comprises at least one additional actuated bending joint operable with each of the frame units, respectively, with each additional bending joint providing controlled bending about an additional lateral axis.

10. A serpentine robotic crawler comprising:
    a first frame having a first continuous track rotatably supported by the first frame;

a first actuated linkage coupled to the first frame wherein the first actuated linkage provides rotational movement about a longitudinal axis;

an elbow-like actuated joint coupled to the first actuated linkage wherein the elbow-like actuated joint provides bending movement about a lateral axis;

a second actuated linkage coupled to the elbow-like actuated joint wherein the second actuated linkage provides rotational movement about a longitudinal axis; and a second frame coupled to the second actuated linkage and having a second continuous track rotatably supported by the second frame.

11. The robotic crawler of claim 10, further comprising at least one additional elbow-like actuated joint coupled between each of the first and second actuated linkages and the first and second frames, wherein each additional elbow-like joint provides bending movement about an additional lateral axis.

12. A method of operating a serpentine robotic crawler comprising:

obtaining a first frame and a second frame, each frame having a drivable continuous track, the first and second frames being coupled together with an actuated multi-degree of freedom linkage arm having a series-coupled combination of actuated joints, the linkage arm comprising:

at least two actuated rotary joints, each providing rotation of one of the first and second frames about a longitudinal axis; and at least one actuated bending joint that provides bending about a lateral axis; and articulating the actuated multi-degree of freedom linkage to establish a desired pose for the serpentine robotic crawler, wherein the longitudinal axes are oriented by the actuated manipulation of the linkage arm about the lateral axis.

13. The method of claim 12, further providing at least one additional actuated bending joint operable with each of the first and second frames, respectively, with each additional bending joint providing controlled bending about an additional lateral axis.

14. A method of operating a serpentine robotic crawler comprising:

providing a first frame and a second frame, each frame having a drivable continuous track;

coupling the first frame to the second frame with an actuated multi-degree of freedom linkage arm that actuates about at least one lateral axis and at least two longitudinal axes, wherein the actuated multi-degree of freedom linkage arm comprises a series-coupled combination of at least seven actuated joints to form the serpentine robotic crawler; and articulating the actuated multi-degree of freedom linkage arm to establish a desired pose for the serpentine robotic crawler.

15. The method of claim 14 further comprising coordinating drive operation of the drivable continuous tracks with articulation of the actuated multi-degree of freedom linkage arm to further control the pose of the serpentine robotic crawler.

16. The method of claim 15 further comprising positioning the first frame and the second frame in a tank-like configuration where the first frame and the second frame are side-by-side and extend in a same direction relative to the actuated multi-degree of freedom linkage arm.

17. The method of claim 15 further comprising positioning the first frame and the second frame in a train-like configuration where the first frame and the second frame are aligned end to end.

18. The method of claim 15 further comprising positioning the first frame and the second frame in a outside-climbing configuration where the first frame and the second frame are oriented with exposed portions of the continuous tracks facing toward each other and in contact with opposite outer surfaces of a structure to be climbed.

19. The method of claim 15 further comprising positioning the first frame and the second frame in an inside-climbing configuration where the first frame and the second frame are oriented with exposed portions of the continuous tracks facing away from each other and in contact with opposite inner surfaces of a structure to be climbed.

20. The method of claim 15 further comprising positioning the first frame and the second frame in a zag configuration where the first frame and the second frame are side-by-side and extend in opposite directions relative to the actuated multi-degree of freedom linkage arm.

* * * * *